March 4, 1947.  E. F. BEGTRUP  2,416,863
PREHEATING METHOD FOR WELDING RAILS AND MOLD THEREFOR
Filed June 29, 1944  3 Sheets-Sheet 1
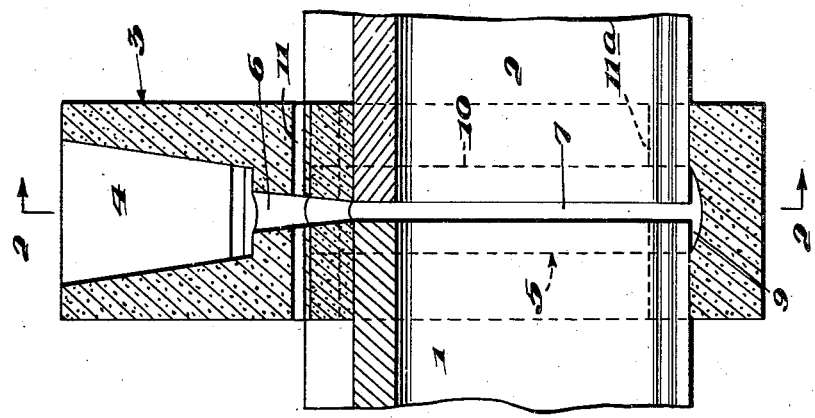
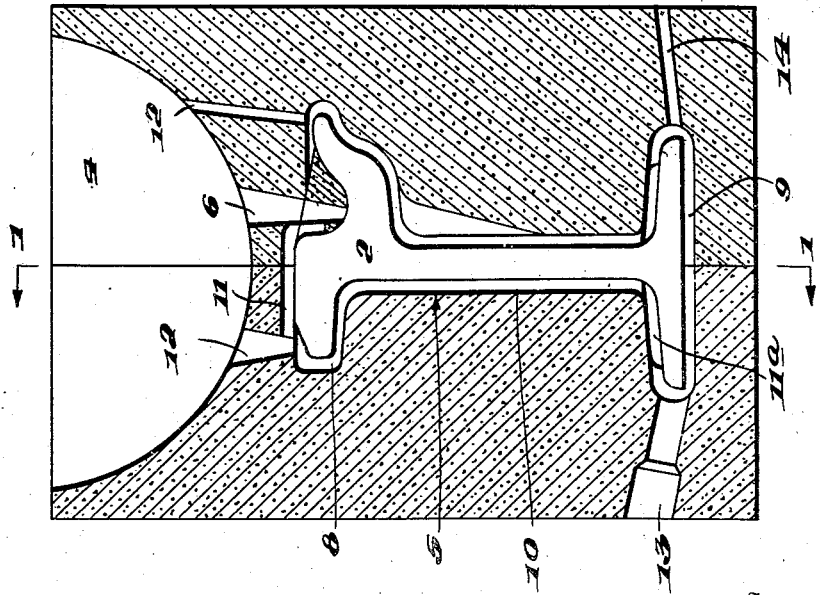
Inventor
EDWARD F. BEGTRUP,
By Henry C. Parker
Attorney

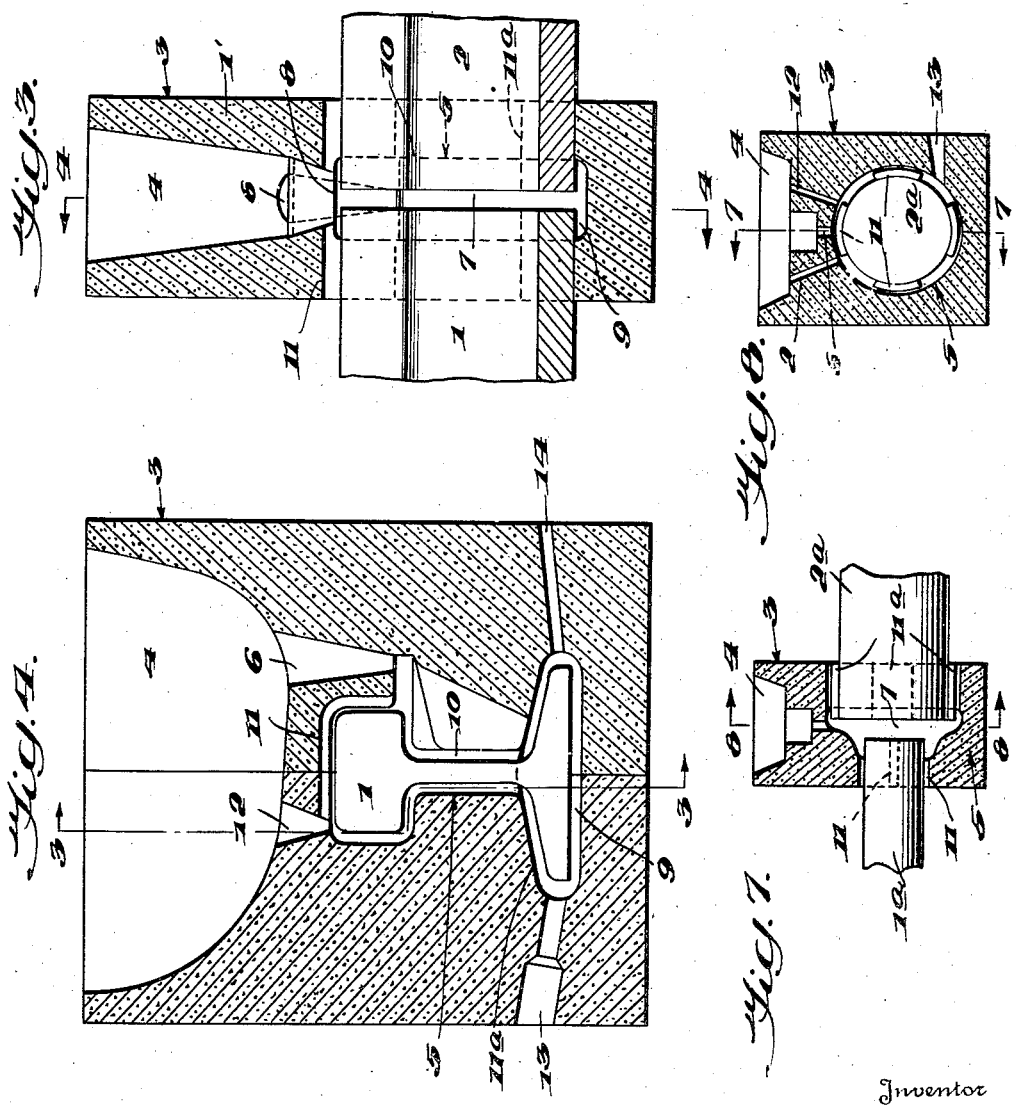

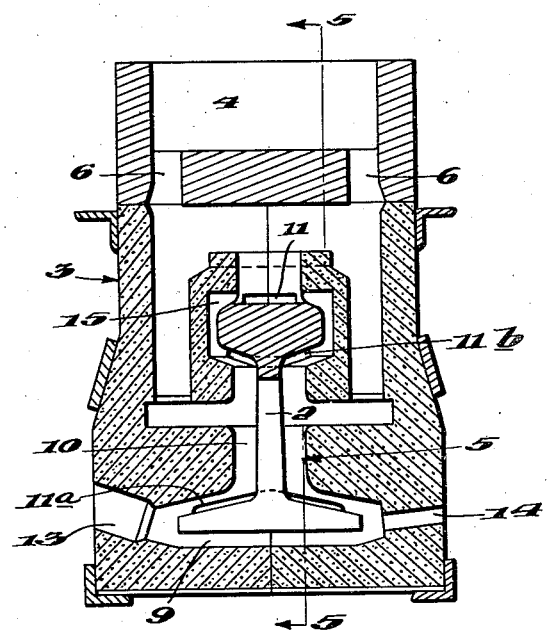
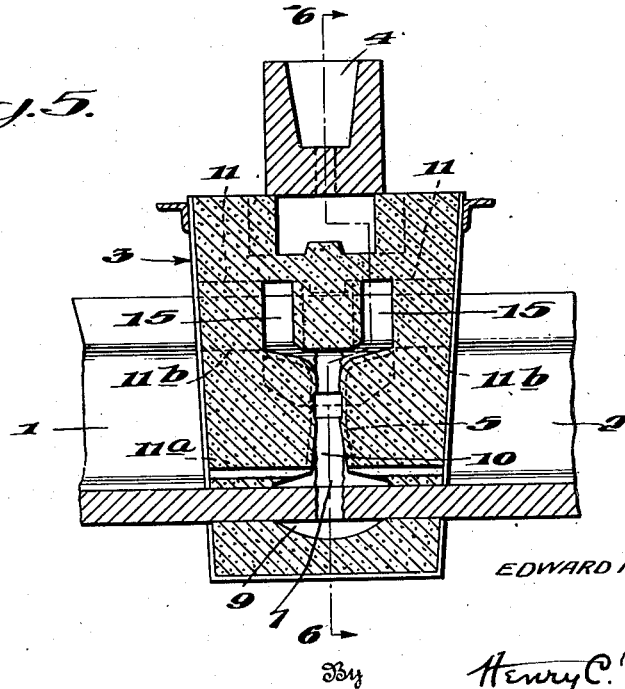

Patented Mar. 4, 1947

2,416,863

UNITED STATES PATENT OFFICE 2,416,863

PREHEATING METHOD FOR WELDING RAILS AND MOLD THEREFOR

Edward F. Begtrup, Elizabeth, N. J., assignor to Metal & Thermit Corporation, New York, N. Y., a corporation of New Jersey Application June 29, 1944, Serial No. 542,653

10 Claims. (Cl. 22—116)

This invention relates to preheating method for welding rails and mold therefor; and it comprises a method of welding metal parts, such as rails for example, wherein said metal parts are alined end to end, a mold is constructed around the resulting joint which defines a fusion collar-forming cavity surrounding the joint; said mold being provided with integral constricted preheating vents forming part of said mold cavity and extending longitudinally in contact with the parts to be welded from said mold cavity out of the mold on either side; then preheating gases are passed into said mold cavity and out through said preheating vents in contact with the parts to be welded until the parts are preheated and superheated aluminothermic metal is then poured into said mold cavity to produce welding of said metal parts; said preheating vents being usually plugged prior to the pouring of the weld metal and being constructed and disposed in such manner that the area of contact of the preheating gases passed through said vents with the surface of each portion of the parts to be welded is at least approximately proportional to the cross section of said portions, while the depth of the vents is advantageously such that the weld metal tends to congeal as it enters the vents without welding to the metal parts. The invention also includes the mold which is used in the described welding method; all as more fully hereinafter set forth and as claimed.

Aluminothermic welding methods have been known for many years. These methods have reached their highest development in the welding of rails. Two aluminothermic methods are in common use for this purpose. In one of these, known as the full fusion method, two rails to be welded are alined end to end leaving a welding gap therebetween, a mold is constructed about the joint with a mold cavity defining a fusion collar-forming space about the heads, the webs and the base flanges of the rails, preheating gases are passed through the mold cavity to preheat the rails at the joint and then superheated aluminothermic metal is introduced into the cavity, this metal fusing with the rail metal and forming a cast weld. The other method, known as the pressure-fusion method, operates upon much the same principle except that in this method the heads of the rails are faced off while their webs and base flanges are trimmed away, the rails being abutted in such fashion that the rail heads are flush while a welding gap is left extending only between the webs and the base flanges of the rails. The mold cavity is so constructed that the superheated aluminothermic metal is cast in the space between the webs and base flanges of the rails while metal and slag heat the heads of the rails to pressure welding temperatures, the welding of the rail heads being produced by pressure. In both of these methods, as well as in the case of the great majority of welds produced by the aluminothermic method, preheating of the parts to be welded is required. And in all of these cases in which the parts to be welded are of irregular cross section or of unequal size, considerable difficulty is encountered owing to the unequal preheating of the parts.

In the preheating methods of the prior art the heavier portions of the parts to be joined have been under-heated while the lighter portions have tended to be over-heated. When the weld metal is poured, any over-heated portions tend to be washed away, causing shrinkage cavities and other difficulties, while under-heated portions suffer from locked-up stresses and cold-shuts or unwelded areas. In the welding of rails, for example, the rail heads have tended to be under-heated while the webs are sometimes over-heated.

I have discovered a very simple method of overcoming these preheating difficulties by means of which parts of irregular cross section or of unequal size can be preheated with a uniformity unknown to the prior art. And I have found that this method for the first time results in welds which are uniformly radiographically sound and substantially free from locked up stresses and other faults.

In my new method the molds, which are constructed around the joint between the parts to be united, are provided with preheating vents or slots which conduct preheating gases from the mold cavity along and in contact with the parts to be welded and laterally out of the mold on either side, these preheating vents being so dimensioned and disposed that the heavier portions of larger cross section of the parts to be welded come in contact with the larger volumes of preheating gases passing through these vents. This increased volume of preheating gases provides efficient and economical means for a greater linear zone of high preheat resulting in maximum transverse preheat expansion without bowing or distortion of the sections. The greater zone of high preheat promotes beneficial slower cooling of the fused and weld metal through the critical temperatures. For best results the volume of the preheating gases contacted with each portion of the parts to be welded should be roughly proportional to the volume or cross section of that part, so that the heat transmitted thereto is proportional to its weight. In other words the contact area of the preheating vents with any portion of the metal parts to be welded should be roughly proportional to the volume or the cross section of that portion. But owing to the fact that the heat is transmitted through the metal away from the joint more rapidly in those portions having the larger cross sections, it is sometimes advantageous to supply at least a slight excess of heat to the heavier portions than is indicated by the rules which have been stated.

The preheating vents which have been described can be plugged prior to the pouring of the weld metal, for example by inserting therein metal strips from the outside of the mold, or by sealing them with clay and sand. But it is advantageous to dimension these vents in such fashion that they become automatically plugged by congelation of the weld metal. This can be accomplished by making their smallest dimension (depth) somewhat less than ¼ inch, say from about ⅛ to 1/16 inch. When this is done the cross section of any weld metal which enters the vents is so small that it quickly congeals, thus plugging the vents.

My new preheating method is particularly applicable to rail welding and to the making of the so-called compromise welds wherein two parts of unequal or unlike cross section are to be joined. In making compromise welds it has always been difficult to produce an equal preheating of the parts and it has been customary in the past to heat the larger of the two parts by means of a furnace or forge place adjacent the mold, rather than attempting to preheat the parts solely by means of a blow torch. Our present method eliminates the necessity of using such auxiliary apparatus.

My invention can be explained in more detail by reference to the accompanying drawing which shows, more or less diagrammatically, several embodiments of molds within this invention which can be used in conducting my process. In this showing, Fig. 1 represents a longitudinal section through a mold, taken along the line 1—1 of Fig. 2, showing the ends of a girder rail in position in the mold ready to be welded by the full-fusion method, Fig. 2 represents a transverse section through the same mold, taken along the line 2—2 of Fig. 1, Fig. 3 represents a longitudinal section through a second mold, taken along the line 3—3 of Fig. 4, showing the ends of a T-rail ready to be welded by the full-fusion method, Fig. 4 is a transverse section through the mold of Fig. 3, taken along the line 4—4 of Fig. 3, Fig. 5 is a longitudinal section through another mold, taken along the line 5—5 of Fig. 6, showing the ends of a T-rail in the mold ready to be welded by the pressure-fusion method, Fig. 6 is a transverse section through the same mold, taken along the line 6—6 of Fig. 5, Fig. 7 is a longitudinal section through a mold, taken along the line 7—7 of Fig. 8, showing the ends of two shafts of different size ready to be welded, while Fig. 8 is a transverse section through the mold of Fig. 7, taken along the line 8—8 of Fig. 7.

In the various figures like parts are represented by like reference numerals. Referring to Figs. 1 and 2 the girder rails to be welded are indicated at 1 and 2, their ends being enclosed in the two-part mold indicated generally at 3. The mold is provided at the top with a pouring basin 4 which is connected with the mold cavity, shown generally at 5, by means of a pouring gate 6 and risers 12. The gap 7 between the rails forms part of the mold cavity, which is sufficiently larger than the gap to form fusion collar-forming sections 8, 9 and 10 about the heads, the bases and the webs of the rails, respectively. The preheating vents of this invention are shown at 11, extending along the tops of the rails, and at 11a, extending along the tops of the base flanges of the rails. These are the rail sections which are difficult to preheat adequately in the welding of this type of rail. Preheating gases, introduced at the gate 13 pass through the mold cavity and outwardly through the preheating vents in contact with the rails, thus producing a uniform preheating of the rail parts.

In the making of a weld between T-rails by the full-fusion method, as shown in Figs. 3 and 4, it is advantageous to provide preheating vents at the same points and of approximately the same general form as in the case of the girder rails. Thus, in Fig. 4 two preheating vents are shown along the tops of the base flanges of the rails and a single vent passing along the tops of the rail heads and extending over one of the faces thereof. The manner of conducting the preheating is the same as in the case of the girder rails of Figs. 1 and 2.

The mold of Figs. 5 and 6 is considerably more complicated than that of Figs. 1 to 4 and is particularly adapted for use in the pressure-fusion welding of T-rails. The prior art construction of this mold is more fully described in my patent, No. 2,292,601. The improved mold of the present invention is provided with preheating vents 11 extending along the tops of the rail heads, a pair of preheating vents 11b extending beneath the heads of the rails on either side and a pair of preheating vents 11a extending on either side of the tops of the rail base flanges. The arrangement of three preheating vents about the rail heads, as shown in Figs. 5 and 6, is somewhat more advantageous than that shown in Figs. 1 to 4, since it provides a more uniform heating. The path taken by the gases during the preheating is believed obvious from the figures. It will be noted that the welding gap in this embodiment extends only between the base flanges and webs of the rails, the heads of the rails being flush. But mold passageways 15 are provided which extend around the rail heads on either side of the joint and the preheating gases flow from these passageways into the preheating vents and then out of the mold to either side, and produce uniform heating of the rails.

Figs. 7 and 8 illustrate the making of a compromise weld in which a small shaft 1a is to be welded to a second shaft 2a of relatively larger cross section. In this case the smaller shaft has approximately one-half the diameter of the larger shaft, hence the surface of the larger shaft, which is exposed to the preheating gases passing through the preheating vents, should be approximately four times that of the smaller shaft. This can be accomplished either by using four times as many preheating vents of the same size or by using vents having approximately four times the width, as in the embodiment shown in the drawing. The mold shown in these figures is provided with two risers 12. Otherwise the elements shown correspond to those described previously. The mode of operation is believed to be obvious from the drawing.

After the preheating operation is completed the preheating vents of the present invention are advantageously plugged, as stated previously, the preheating gate is also plugged and then the mold is ready to receive the superheated weld metal. The latter is introduced into the pouring basin from a crucible in which an aluminothermic charge has been ignited. The superheated metal passes through the pouring gate or gates into the bottom of the mold, filling up the welding gap between the parts to be welded. If the preheating vents are not plugged, the weld metal tends to flow into these vents but, owing to their constricted cross section, this metal quickly congeals thus automatically plugging the vents. In the case of the pressure-fusion weld the slag and weld metal heats the abutting rail heads to welding temperatures and welding is accomplished by means of applied pressure. After the weld metal has cooled sufficiently, the mold is then removed from the weld and the excess weld metal is trimmed where necessary.

While I have described what I consider to be the best embodiments of this invention, it is obvious, of course, that variations can be made in the specific procedures and structures which have been described without departing from the purview of this invention. It is believed that the description given is sufficiently complete so that anyone skilled in the art can readily apply this invention to the making of full fusion welds of all types. In order to gain at least part of the benefits of our invention it is only necessary to provide one or more of my preheating vents in such position as to increase the preheat transmitted to the heavier portions of the parts to be welded or to supply extra preheat at any point at which there is a tendency to form locked up stresses or cold shuts. It is easy to provide these preheating vents in a mold at any point where they appear necessary or desirable. And the improvement in the welds thus produced is substantial. For best results it is necessary to follow the general rules which have already been stated with respect to the relative dimensions and dispositions of the preheating vents and, as stated, it is usually desirable to provide at least a slight excess of heating capacity, in the way of preheating vents, in contact with the heavier sections of the parts to be welded than is indicated by these rules. There is little if any danger of over-heating these parts while there is always a danger that they may be under-heated unless the preheating step is conducted with care. Molds of widely different type can be employed provided that their structures do not interfere with the proper placing of the preheating vents. Parts of widely different shape and dimensions can be welded using my method and the preheating time, regardless of the shape, can be reduced thus increasing production rate and minimizing preheat oxidation. The weld collar space for preheating may be reduced to a minimum and the amount of thermit required for the operation decreased. Further modifications of this invention which fall within the scope of the following claims will be immediately evident to those skilled in this art.

What I claim is:

1. In the uniting of rails by full fusion welds, the process which comprises alining two rails end to end leaving a welding gap therebetween, constructing a mold about the resulting joint having a mold cavity which encloses said welding gap and being provided with a plurality of integral preheating vents forming part of said mold cavity and which extend along and in contact with said rails from said mold cavity laterally out of the mold on either side, said preheating vents being so dimensioned and disposed that their areas of contact with different portions of the rails are at least roughly in proportion to the cross section of these parts, passing preheating gases through said mold cavity and said preheating vents, whereby a more uniform preheating of the rails is produced than could be produced in the absence of said preheating vents, and then pouring superheated aluminothermic metal into said mold cavity to produce welding of said rails.

2. In the making of compromise welds in which one metal part is welded to a second part of relatively larger cross section by a full fusion weld, the preheating process which comprises passing preheating gases into a mold cavity surrounding a welding gap between said parts, dividing said gases into a plurality of streams and passing said streams laterally out of the mold in contact with at least one of said parts, said streams being so disposed and of such dimensions that the volume of the preheating gases contacted with the surface of said second part is greater than that contacted with said first part, whereby a more uniform preheating of said parts is produced than could be produced in the absence of said preheating vents.

3. The process of claim 2 wherein said preheating vents are plugged prior to the introduction of weld metal into the said mold.

4. The process of claim 2 wherein the smallest dimension of said preheating vents is sufficiently small so that weld metal entering said vents tends to congeal without welding to the metal.

5. The process of claim 2 wherein the smallest dimension of said preheating vents is from about $\frac{1}{8}$ to $\frac{3}{16}$ of an inch.

6. A mold for the aluminothermic welding of metal parts of irregular cross section having at least one portion of larger cross section than another portion, which comprises mold parts adapted to surround and enclose the ends of two of such metal parts which are alined end to end, said mold parts forming a mold cavity enclosing the resulting joint and defining a fusion collar-forming space about said joint, a preheating gate connected with said mold cavity and at least one pair of preheating vents extending from said mold cavity laterally out of the mold on either side along and in contact with said portion of larger cross section, whereby the preheating of said portions tends to be equalized.

7. A mold for the full fusion welding of metal parts one of which has a cross section larger than the other, which comprises mold parts adapted to surround and enclose the ends of such metal parts which are alined end to end leaving a welding gap therebetween, said mold parts forming a mold cavity enclosing said welding gap and defining a fusion collar-forming space about said gap, a preheating gate connected with said mold cavity, and at least one constricted preheating vent extending from said mold cavity laterally out of the mold along and in contact with said part of larger cross section and adapted substantially to equalize the preheating of said parts.

8. A mold for the aluminothermic welding of rails, which comprises mold parts adapted to surround and enclose the ends of the rails to be welded which are alined end to end, said mold parts forming a mold cavity enclosing the resulting joint and defining a fusion collar-forming space about the bases, the webs and the heads of said rails, a preheating gate connected with said mold cavity and at least one pair of integral preheating vents forming part of said mold cavity and extending from said mold cavity along and in contact with the rail heads laterally out of the mold, said preheating vents being disposed and dimensioned in such manner that the contact area between said vents and the rail heads is greater than that between any vents contacting the bases and webs of the rails, whereby the preheating of the heads, bases and webs of the rails tends to be equalized.

9. A mold for the aluminothermic welding of rails, which comprises mold parts adapted to surround and enclose the ends of the rails to be welded which are alined end to end, said mold parts forming a mold cavity enclosing the resulting joint and defining a fusion collar-forming space about the bases, the webs and the heads of said rails, a preheating gate connected with said mold cavity and a plurality of integral preheating vents forming part of said mold cavity and extending from said mold cavity along and in contact with the rail heads and the rail bases laterally out of the mold on either side, said preheating vents being disposed in such manner that the contact areas between the preheating vents and the heads and bases of the rails are substantially in proportion to the cross sections of these parts, whereby the preheating of these parts tends to be equalized.

10. A mold for the aluminothermic welding of metal parts, which comprises mold parts adapted to surround and enclose the ends of two metal parts to be united which parts are alined end to end, said mold parts forming a mold cavity enclosing the resulting joint and defining a fusion collar-forming space about said joint, a preheating gate connected with said mold cavity and a plurality of integral preheating vents forming part of said mold cavity and extending from said mold cavity laterally out of the mold on either side along and in contact with said metal parts, the areas of contact of said preheating vents with the surfaces of different portions of said metal parts being approximately in proportion to the cross sections of said portions.

EDWARD F. BEGTRUP.

REFERENCES CITED

The following references are of record in the file of this patent:

UNITED STATES PATENTS

| Number | Name | Date |
| --- | --- | --- |
| 2,292,601 | Begtrup | Aug. 11, 1942 |
| 1,917,868 | Begtrup | July 11, 1933 |